United States Patent
Eagar et al.

(10) Patent No.: US 10,460,482 B2
(45) Date of Patent: Oct. 29, 2019

(54) METHOD AND SYSTEM FOR AUTOMATED GENERATION OF CONSTRAINED CURVES IN COMPUTER GRAPHICS

(71) Applicant: Robert Bosch GmbH, Stuttgart (DE)

(72) Inventors: Joseph Eagar, Cameron Park, CA (US); Yen-Lin Chen, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/659,991

(22) Filed: Jul. 26, 2017

(65) Prior Publication Data
US 2019/0035120 A1   Jan. 31, 2019

(51) Int. Cl.
| | | |
|---|---|---|
| *G06T 11/20* | (2006.01) | |
| *G06T 1/60* | (2006.01) | |
| *G01C 21/32* | (2006.01) | |
| *G06F 17/50* | (2006.01) | |
| *G06F 3/0488* | (2013.01) | |

(52) U.S. Cl.
CPC ............ *G06T 11/203* (2013.01); *G01C 21/32* (2013.01); *G06F 3/04883* (2013.01); *G06F 17/5018* (2013.01); *G06T 1/60* (2013.01)

(58) Field of Classification Search
CPC .......... G06T 11/203; G06T 1/60; G06T 11/20
USPC ........................................................ 345/442
See application file for complete search history.

(56) References Cited

U.S. PATENT DOCUMENTS

| | | | |
|---|---|---|---|
| 6,919,888 B1* | 7/2005 | Perani | G06T 17/20 345/420 |
| 2008/0005212 A1 | 1/2008 | Levien | |
| 2009/0144031 A1 | 6/2009 | Witmer | |
| 2010/0082248 A1* | 4/2010 | Dorum | G01C 21/32 701/533 |
| 2010/0220099 A1* | 9/2010 | Maekawa | G06F 17/50 345/419 |
| 2011/0164041 A1* | 7/2011 | Miura | G06T 11/203 345/442 |

(Continued)

OTHER PUBLICATIONS

Pivtoraiko, Mihail et al., "A Study of Polynomial Curvature Clothoid Paths for Motion Planning for Car-like Robots", The Robotics Institute, Carnegie Mellon University, Dec. 2004 (21 pages).

(Continued)

*Primary Examiner* — Jin Cheng Wang
(74) *Attorney, Agent, or Firm* — Maginot Moore & Beck LLP

(57) ABSTRACT

A method for automated generation of curves for computer graphics includes receiving a first control point corresponding to a first location in a two-dimensional plane and a second control point corresponding to a second location in the two-dimensional plane, receiving at least one constraint for at least one of the first control point and the second control point, and generating a first set of parameter points to generate a first spline connecting the first control point to the second control point based on the at least one constraint using a multigrid solver, the first set of parameter points including a first predetermined number of parameter points, each parameter point in the first set of parameter points corresponding to a location in the two-dimensional plane and a one-dimensional curvature parameter.

16 Claims, 5 Drawing Sheets

(56) References Cited

U.S. PATENT DOCUMENTS

| | | | | |
|---|---|---|---|---|
| 2012/0078867 A1* | 3/2012 | Dorum | ............ | G09B 29/10 |
| | | | | 707/705 |
| 2014/0200864 A1 | 7/2014 | Bauschke et al. | | |
| 2016/0245657 A1* | 8/2016 | Dorum | ............ | G01C 21/32 |
| 2016/0377440 A1* | 12/2016 | Dorum | ............ | G01C 21/30 |
| | | | | 702/150 |
| 2017/0213466 A1* | 7/2017 | Azar | ............ | G08G 5/0034 |
| 2017/0364076 A1* | 12/2017 | Keshmiri | ......... | G05B 19/042 |

OTHER PUBLICATIONS

McCrae, J., et al., "Sketching Piecewise Clothoid Curves", Dynamic Graphics Project, University of Toronto, EUROGRAPHICS Workshop on Sketch-Based Interfaces and Modeling, 2008 (8 pages).

Levien, Raphael Linux, "From Spiral to Spline: Optimal Techniques in Interactive Curve Design," University of California, Berkeley, 2009 (191 pages).

International Search Report corresponding to International Patent Application No. PCT/EP2018/069226 (5 pages), dated Oct. 11, 2018.

Cripps, R. J. et al., "Smooth polynomial approximation of spiral arcs," Journal of Computational and Applied Mathematics, 2010, vol. 233, pp. 2227-2234 (8 pages).

Weiss, D., "Feature-based spline optimization in CAD," Structural and Multidisciplinary Optimization, vol. 42, pp. 619-631, 2010 (13 pages).

\* cited by examiner

METHOD AND SYSTEM FOR AUTOMATED GENERATION OF CONSTRAINED CURVES IN COMPUTER GRAPHICS

FIELD

This disclosure relates generally to the field of computer aided design and graphics and, more specifically, to methods and systems for the automated generation of curves based on constraints in computer design and graphics applications.

BACKGROUND

Computer graphics and design applications often require the production of curved shapes both for the design of physical objects and for artistic illustrations. Of course, modern computerized illustration systems can capture hand-drawn curves from a human user, but in many instances the curves must follow specific constraints for the design of a physical object. For example, many roads include straight linear sections and curved sections that follow an arc shape, such as a portion of the outer circumference of a circle. In another example, the designs of highways and railway lines often employ clothoids, which are also known to the art as "Euler spirals" or "Cornu spirals", that provide curves with a constantly changing curvature along the length of the curve that are useful in, for example, on-ramps and off-ramps in highways that enable vehicles to experience a smooth transition when turning from a first direction to a second direction along the highway.

While various types of curves are well-known to the art, in computerized graphics systems the combinations of various curve types into complex shapes can still present challenges in computational graphics systems. In particular, computerized graphics systems often use well-known constructs such as splines to represent curves in computer graphics. However, combining straight lines, arcs, and clothoids into splines presents challenges, given the need to switch curve types on the fly for different point configurations. Consequently, improvements to computer graphics systems that enable generation of complex curves in an automated manner would be beneficial.

SUMMARY

In one embodiment, a method for automated generation of curves for computer graphics has been developed. The method includes receiving, with an input device, a first control point corresponding to a first location in a two-dimensional plane and a second control point corresponding to a second location in the two-dimensional plane, the first location and the second location being two points on a curve in the two-dimensional plane. The method includes receiving, with the input device, at least one constraint for at least one of the first control point and the second control point, and generating, with the processor, a first set of parameter points to generate a first spline connecting the first control point to the second control point based on the at least one constraint using a multigrid solver, the first set of parameter points including a first predetermined number of parameter points, each parameter point in the first set of parameter points corresponding to a location in the two-dimensional plane and a one-dimensional curvature parameter.

In another embodiment, a system for generating graphics has been developed. The system includes an input device, a graphical display device, a memory, and a processor operatively connected to the input device, the graphical display device, and the memory. The processor is configured to receive a first control point corresponding to a first location in a two-dimensional plane and a second control point corresponding to a second location in the two-dimensional plane, the first location and the second location being two points on a curve in the two-dimensional plane, with the input device, receive at least one constraint for at least one of the first control point and the second control point with the input device, generate a first set of parameter points to generate a first spline connecting the first control point to the second control point based on the at least one constraint using a multigrid solver, the first set of parameter points including a first predetermined number of parameter points, each parameter point in the first set of parameter points corresponding to a location in the two-dimensional plane and a one-dimensional curvature parameter, and generate a graphical rendering of the first spline connecting the first control point to the second control point in the two-dimensional plane in response to the first spline satisfying the at least one constraint with the graphical display device.

DETAILED DESCRIPTION

Figure 1:
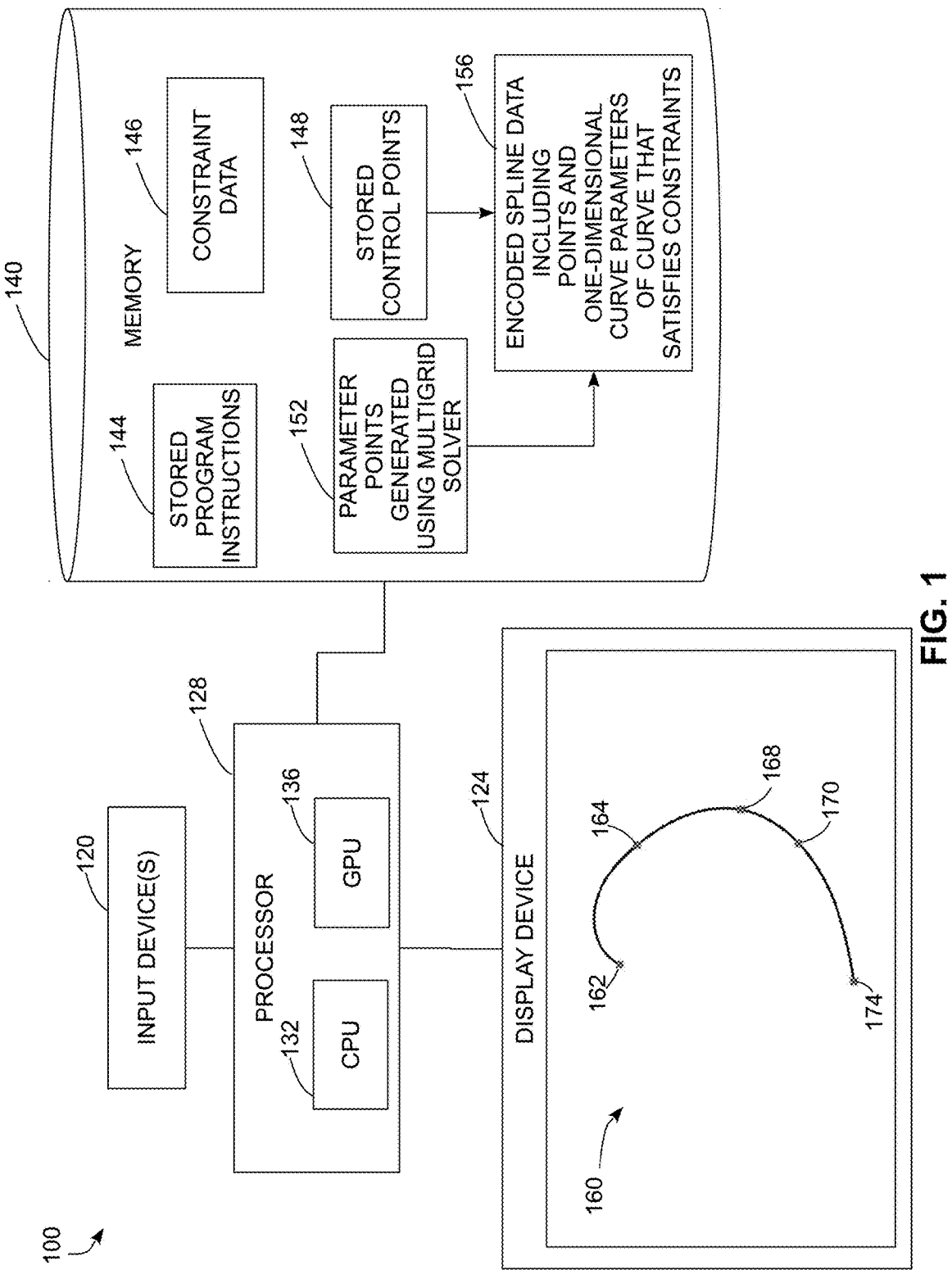
FIG. 1 is a schematic diagram of a computerized system that automatically generates splines and graphical depictions of curves based on the splines.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "curvature" refers to a rate of angular change of a curved line segment. A straight line segment has no curvature over the length of the line segment since the angle (slope) of the line is constant. An arc segment has a non-zero constant curvature over the length of the arc, such as an arc that defines a portion of a circle. A clothoid segment has a curvature that changes at a constant rate over the length of the clothoid segment. As described herein, different segments of the generated splines have different curvature levels that are expressed with a curvature parameter term k. The curvature parameter k is referred to as a one-dimensional curvature parameter because the curvature that is associated with the parameter points or control points is a parameter of a one-dimensional polynomial function that defines the curvature as either a flat line or a line with a constant slope.

As used herein, the term "spline" refers to a piece-wise polynomial numeric function that describes a complex curve using at least one segment with a curvature that is described using a one-dimensional curvature parameter, with many splines including two or more segments that form the larger complex curve from a series of smaller curves. In the description herein, some segments of splines can be straight-line segments that are broadly considered to be "curves" with zero curvature. In this application, each segment of the spline is described using a polynomial function that describes a curve that joins two control points in the spline, and in some configurations the spline includes three or more control points that separate the spline into segments, where a spline has N–1 segments given N control points (e.g. two (2) segments in a spline with three (N=3) control points). The curves are said to be "end clamped" since the curve passes through each of the control end points and intermediate control points (if any). In one embodiment, the generated spline is a uniform B-spline with a general form of $f(x)=w_1(x)*k_1+w_2(x)*k_2 \ldots w_n(x)*k_n$ where each of the terms 1 to n represents one segment of the spline with the one-dimensional curvature parameter k.

As used herein, the term "control point" refers to a fixed point in a spline that affects the shape of the spline between two or more control points that form the fixed locations in the curve while the system 100 generates the remaining shape of the curve that meets all of the constraints dynamically. The start point and end point of the entire curve are two control points, but in some embodiments a spline includes one or more intermediate control points that are generated via an input device or through an automated process in computer-generated graphics. In the embodiments described herein, the splines are formed from two or more segments that pass through control points where each spline segment has a curvature that is generated using a one-dimensional curvature function. The ends of adjacent segments are spatially continuous with one another and, as described below, optionally satisfy the tangent, curvature, and acceleration continuity constraints that are described below.

As used herein, the term "parameter point" refers to a dynamically generated point in a spline that affects the shape of the spline between control points, between other parameter points, or between a combination of control points and other parameter points in the spline. Each segment of the spline between connected parameter points or control points is defined as a curve that has a one-dimensional curvature function where different segments of the spline may include different curvatures. As described herein, an automated system generates splines that satisfy one or more constraints using both control points and the parameter points. In the completed spline, the control points and the parameter points are effectively identical to one another in defining the structure of the spline. However, during the automated process that forms the spline, the control points and parameter points are distinguished in that the control points are located at fixed positions with fixed constraints that must be met to form the spline, while the parameter points are generated dynamically in an automated process that enables generation of splines that satisfy a set of tangent, curvature, and acceleration continuity constraints.

Figure 3:
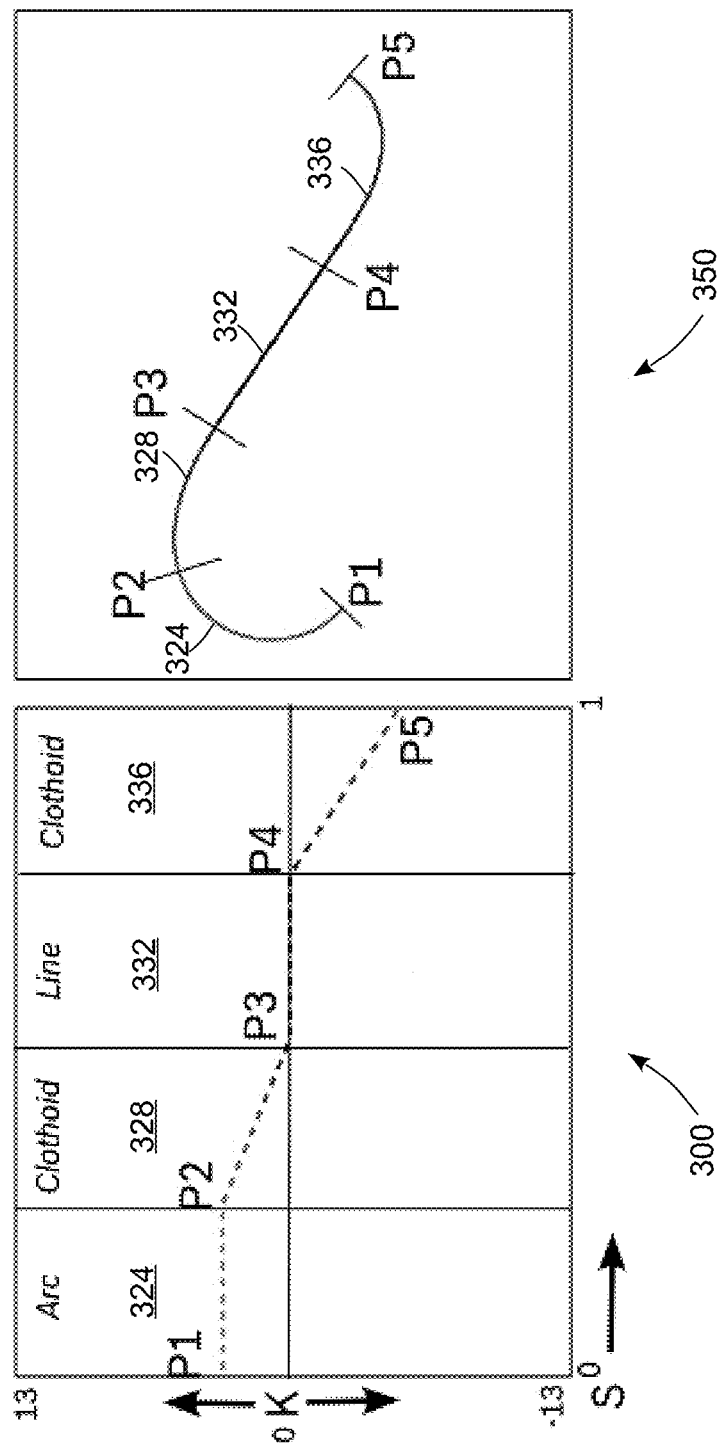
FIG. 3 is a diagram depicting the generation of a spline segment with different one-dimensional curvature parameters including a linear segment, an arc segment, and a clothoid segment.

FIG. 3 provides a visual depiction of the one-dimensional curvature parameters for straight lines, arcs, and clothoids. In FIG. 3, the graph 300 depicts a degree of curvature K at different locations over the length of a spline S, which further comprises individual spline elements 324, 328, 332, and 336. The illustration 350 depicts a curve that is generated using the spline elements 324-336 with a first control point P1, a second control point P5, and three intermediate parameter points P2-P4 that define the spline segments. In FIG. 3, the arc segment 324 has a constant curvature as shown in the graph 300 as a constant, non-zero one-dimensional curvature parameter and as depicted in the illustration 350 as an arc 324 that circumscribes a portion of a circle. The graph 300 depicts two one-dimensional curvature parameters that are defined as lines with a constant non-zero slope, which form clothoid curves 328 and 336 that each have a linear change in curvature over the length of the clothoid spline segments. The clothoid 328 has a positive curvature with a negative slope and the clothoid 336 has a negative curvature with a steeper negative slope. The straight line segment 332 has a constant one-dimensional curvature parameter of zero. As depicted in the illustration 350, the straight line spline segment 332 connects the clothoid spline segments 328 and 336.

FIG. 1 depicts a system 100 that automatically generates curves that satisfy input constraints and that generates graphics of the curves for various applications including illustration and computer aided design applications. The system 100 includes one or more input devices 120, a graphical display device 124, a processor 128, and a memory 140.

In the system 100, the input devices 120 include, for example, one or more of a mouse, keyboard, digitized drawing pad, touchscreen, or any other suitable input device that enables a user to provide input coordinates for start and end points for a curve and to enter constraints corresponding to one or both of the start and end points for the curve. As used herein, a reference to an input device receiving input refers to either a single input device or any combination of the input devices that receive the input from the user. The graphical display device 124 is, for example, an LCD display panel, or any other output device that generates a graphical depiction of the curves generated in the system 100 including virtual reality (VR) goggles and the like. In some embodiments the graphical display device 124 is integrated with a touchscreen input device to enable touch input from the user either using a stylus or via direct touch input. In another embodiment the graphical display device 124 is a printer that forms a printed image. In FIG. 1 the graphical display device 124 displays an example of a curve 160 that is formed from a spline that begins at a first control point 162 at a first location in a two-dimensional plane and continues to a second control point 174. As is described in more detail below, the system 100 automatically generates the spline segments that connect two or more fixed control points, such as the control points 162 and 174, using a piecewise spline that is divided into multiple segments, such as the segments that are formed using the dynamically generated parameter points 164, 168, and 170 in FIG. 1. The system 100 generates the spline 160 to satisfy at least one constraint associated with the control points 162 and 174 while also optimizing the shape of the spline segments to minimize the number of parameter points that are required to meet the constraints for the curve. While the curve 160 and other curves that are illustrated in this document provide graphical depictions of the control points and parameter points for illustrative purposes, those of skill in the art will recognize that some graphical display devices generate graphics of the curves that are formed from the splines without producing a graphical depiction of the corresponding control points and parameter points that define the splines.

In the system 100, the processor 128 includes a central processing unit (CPU) 132 and a graphics processing unit (GPU) 136 that are operatively connected to the input devices 120, the graphical display device 124, and the memory 140. In the processor 128, the CPU 132 is, for example, a single or multi-core general purpose digital processor that implements a variant of the x86, ARM, POWER, MIPS, or RISC instruction sets. The GPU 136 include one of more shader processors and digital hardware units that implement graphics processing and the generation of graphical outputs including, for example, texture management units and raster operations pipeline units that generate graphical output data for the display device 124. In some embodiments the CPU 132 and GPU 136 are discrete components that are connected to each other via a data interconnect, such as PCI express or another suitable interconnect, while in other embodiments the CPU 132 and GPU 136 are combined into a single digital logic device in a system on a chip (SoC) configuration. During operation, both the CPU 132 and GPU 136 execute stored program data 144 that are held in the memory 140 to perform the automated generation of splines and other graphics corresponding to the splines that are described herein using a multigrid solver. While FIG. 1 depicts a single processor 128 that is implemented using a single computing device for illustrative purposes, in other embodiments the processor 128 is implemented using multiple discrete computing devices in a clustered configuration.

The memory 140 includes, for example, both volatile digital data storage devices such as random access memory (RAM) and non-volatile data storage devices such as magnetic or optical disks and solid-state data storage devices. In embodiment of FIG. 1, the memory 140 stores the stored program instructions 144 and constraint data 146 that correspond to the constraints for curves that pass through stored control points 148. The memory 140 also stores dynamically generated parameter points 152 that the system 100 generates using a multigrid solver to form a spline that passes through the fixed control points while satisfying the constraints that are associated with the control points. After the system 100 generates a curve that satisfies all of the constraints in the form of a piecewise spline, the processor 128 stores encoded representation of the spline with the encoded spline data 156 including the relative locations of the control points and parameter points in a two-dimensional plane and one-dimensional curve parameter data associated with the parameter points to enable the system 100 or another computer graphics system to reproduce a graphical depiction of the curve based on the encoded spline data 156.

Figure 2:
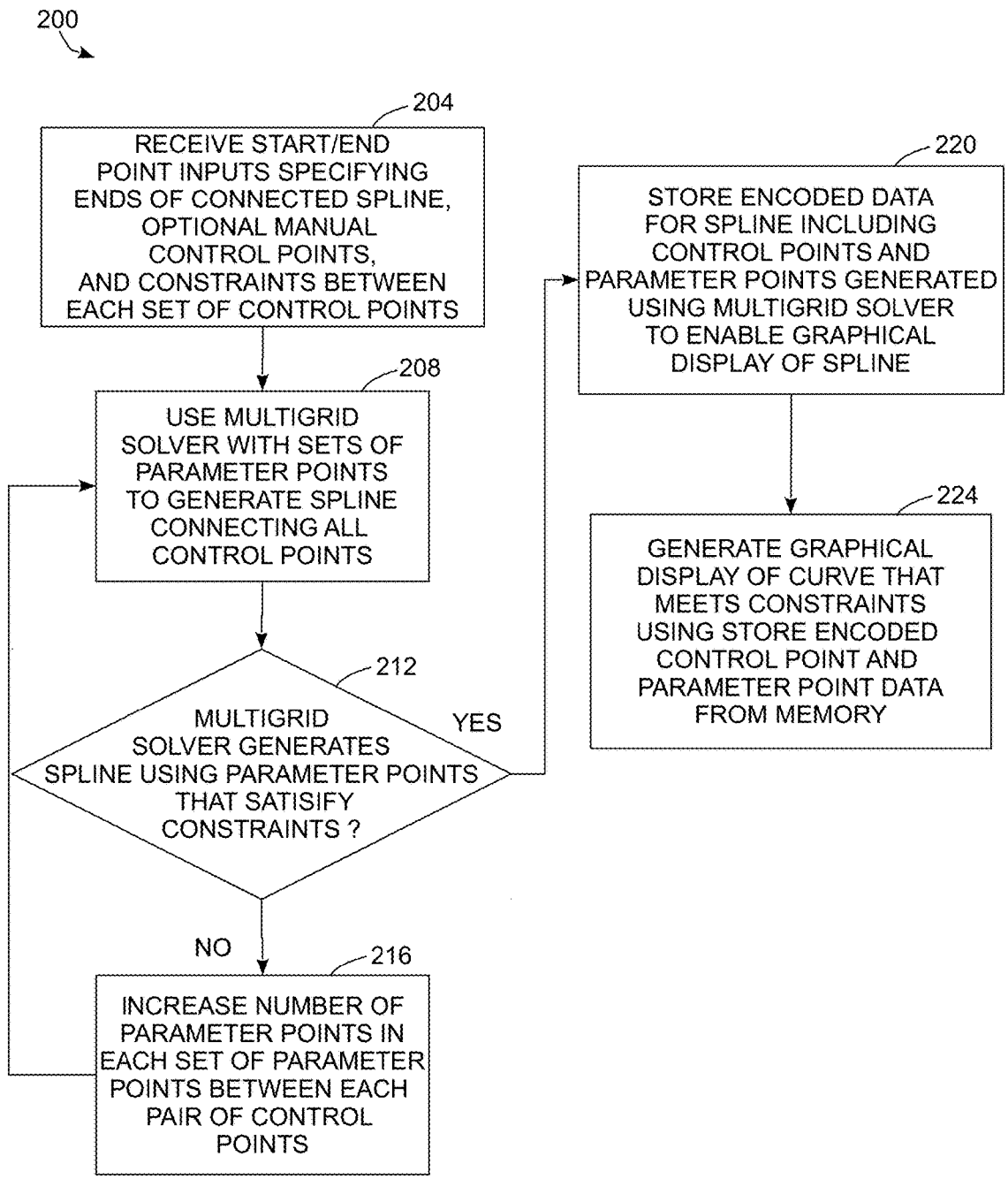
FIG. 2 is a block diagram of a process for automatic generation of splines and graphical depictions of curves based on the splines.

FIG. 2 depicts a process 200 for automated generation of curves that satisfy input constraints and generation of computer graphics outputs of the curves. In the description below, a reference to the process 200 performing a function or action refers to the operation of one or more digital processing devices to execute stored program instructions to perform the function or action in association with other components in a computer graphics system. The process 200 is described in conjunction with the system 100 of FIG. 1 for illustrative purposes.

Process 200 begins as the system 100 receives user input to specify a start point and an end point for a curve at a first location and a second location, respectively, in a two-dimensional plane, optionally one or more manually entered control points, and at least one constraint for the curve associated with either or both of the start and end points (block 204). As described above, in the system 100 the user provides the input via the user interface devices 120 to specify the locations of the start control point and end control point of the curve and optionally one or more intermediate control points that define the general shape and constraints of the curve. Using the illustration of the curve 504 in FIG. 4 as an example, the control points include a starting control point 505 and an ending control point 542 at either end of the curve 504. The curve 504 also includes multiple intermediate control points such as the control points 506, 507, 508, 510, and 512. At least one constraint is associated with the control points, either individually or applied to all of the control points.

In some embodiments, the start and end control points are part of a manual illustration that the user provides to the system 100 to enable the system 100 to automatically generate splines that incorporate complex curves into manual illustrations. For example, in one embodiment the input devices 120 receive a user input corresponding to a straight line or a more complex line such as a Bezier curve that is drawn by the user. The processor 128 identifies one end point of the line as a first control point or a final control point for the curve and the process 200 generates a curve through one or more additional control points that can connect smoothly to the lines in manually drawn illustrations.

As used herein, the term "constraint" refers to a requirement for a type of continuity for the spline at either the start point of the spline or the end point of the spline. Depending upon the constraint, the continuity enables the generation of curves that correspond to physical objects with various properties, such as roads that enable a vehicle to travel with a constant velocity or acceleration through the start point and end point of the spline. The system 100 receive constraint input via the input device 120 for at least one of the control points to specify at least one of a "tangent" continuity, "curvature" continuity, and "acceleration" continuity constraint. While not described in further detail herein, the system 100 always generates splines that have spatial continuity, which is to say that the generated splines form curves that always pass through the control point locations that system 100 receives from the user during process 200.

Figure 5:
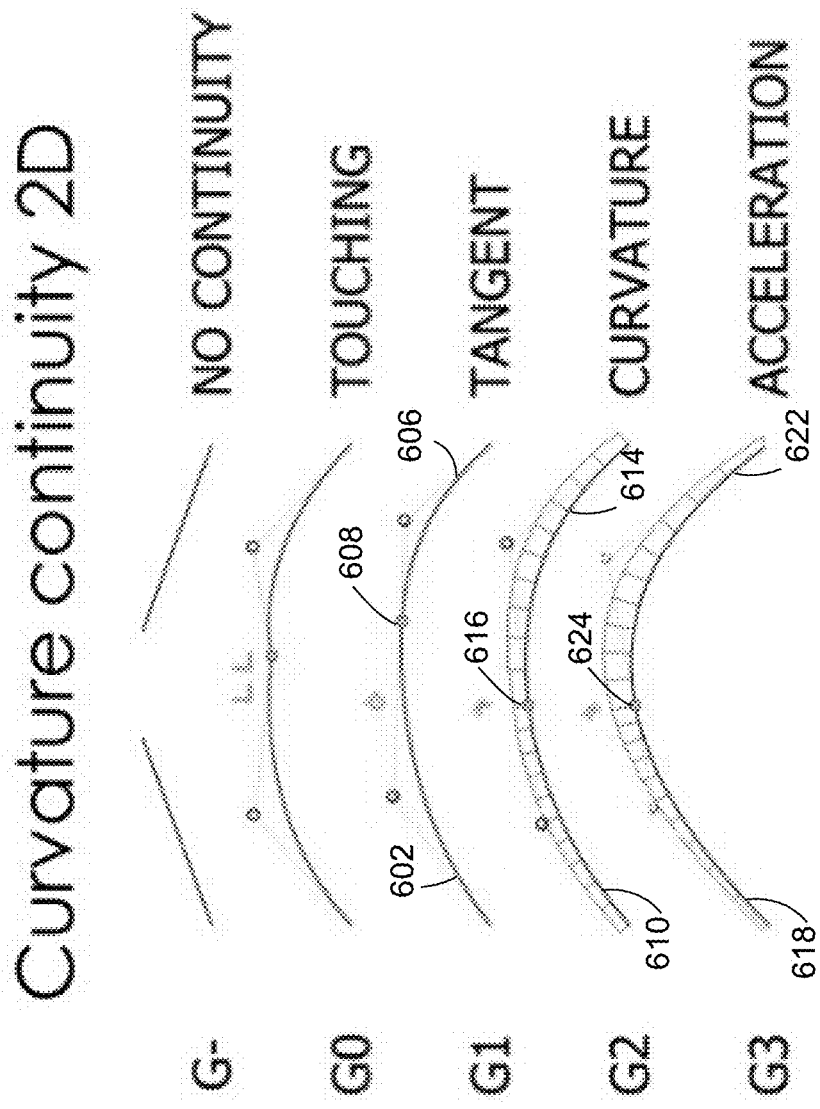
FIG. 5 is a prior art diagram depicting different types of continuity that form the bases for constraints for different curves.

FIG. 5 is a prior art diagram depicting examples of each type of continuity for the constraints. Tangent continuity, which is sometimes referred to as "G1" continuity, refers to a continuity in which a single tangent line at a point 608 that joins two curved segments 602 and 606 is tangent to both of the curve segments 602 and 606. Curvature continuity, which is sometimes referred to as "G2" continuity, refers to a continuity in which the curvature of two curved segments 610 and 614 are the same at a point 616 where the two curved segments connect to each other, although other locations along the curved segments 610 and 614 may have different curvature levels. In FIG. 5 the perpendicular lines extending from the curve segments 610 and 614 represent the direction and magnitude of the curvature at different locations of the curve segments 610 and 614. Acceleration continuity, which is sometimes referred to as "G3" continuity, refers to a continuity in which the magnitude and rate of change of the curvature of one curved spline segment 618 is the same as the magnitude and rate of change of the curvature of another curved spline segment 622 at the point 624. For example, in FIG. 5, the curved segment 618 shows a linearly increasing rate of curvature approaching the point 624, and at the point 624 the curved segment 622 has the same level of curvature and rate of increase in the curvature to provide the acceleration continuity at the location of the point 624. The points 608, 616, and 624 are, for example, the start point or end point of a spline or an end point of a spline segment that the system 100 generates automatically during the process 200. While the tangent, curvature, and acceleration continuity are generally known to the art, the system 100 automatically generates curve segments in a spline that satisfy specified tangent, curvature, and continuity constraints using spline segments that are produced using a uniform polynomial representation for straight lines, arcs, and clothoids in a manner that is not known to the art.

Expressed mathematically, tangent continuity is expressed for two adjoining segments $l_1$ and $l_2$, with shared parameter points $s_1$ and $s_2$ as $$T_1 = \begin{pmatrix} \sin(\theta_1(s_1) + A_1) \\ \cos(\theta_1(s_1) + A_1) \end{pmatrix}$$

$$T_2 = \begin{pmatrix} \sin(\theta_2(s_2) + A_2) \\ \cos(\theta_2(s_2) + A_2) \end{pmatrix}$$

To determine if two generated curve segments are tangent to one another to within a predetermined error boundary to satisfy a tangent continuity constraint, the constraint error function is: $f(l_1, l_2, s_1, s_2) = a \cos(T_1 \cdot T_2)$ Expressed mathematically, the constraint function that determines if two segments satisfy a curvature continuity constraint is $$f(l_1, l_2, s_1, s_2) = \left| \frac{k(l_1, s_1)}{scale_1} - \frac{k(l_2, s_2)}{scale_2} \right|$$

where once again $l_1$ and $l_2$ are adjacent curved spline segments, with shared parameter points $s_1$ and $s_2$. In the equation above, the function k refers to the curvature function of each line segment $l_1$ and $l_2$ at the particular point $s_1$ and $s_2$, respectively, which produces a numeric curvature value, and $scale_1$ and $scale_2$ are predetermined numeric scaling coefficients.

The acceleration continuity constraint refers to a constraint that seeks to minimize the differences in the second derivative (or optionally higher-order derivatives) corresponding to the rates of change in curvature of the spline segments that are connected together at each control point. In one example the "acceleration" of each spline segment that join each other at the control point refers to the rate of change of the curvature for each spline segment identified at the location of the control point, which is effectively a zero-length portion of each spline segment, over the length of the spline segment in a manner that is analogous to the common understanding of acceleration of a velocity of an object as the instantaneous rate of change of velocity of the object over time. The system 100 identifies the error as the difference between the acceleration values of two different spline segments at the control point to identify if the spline segments satisfy an acceleration constraint.

Figure 4:
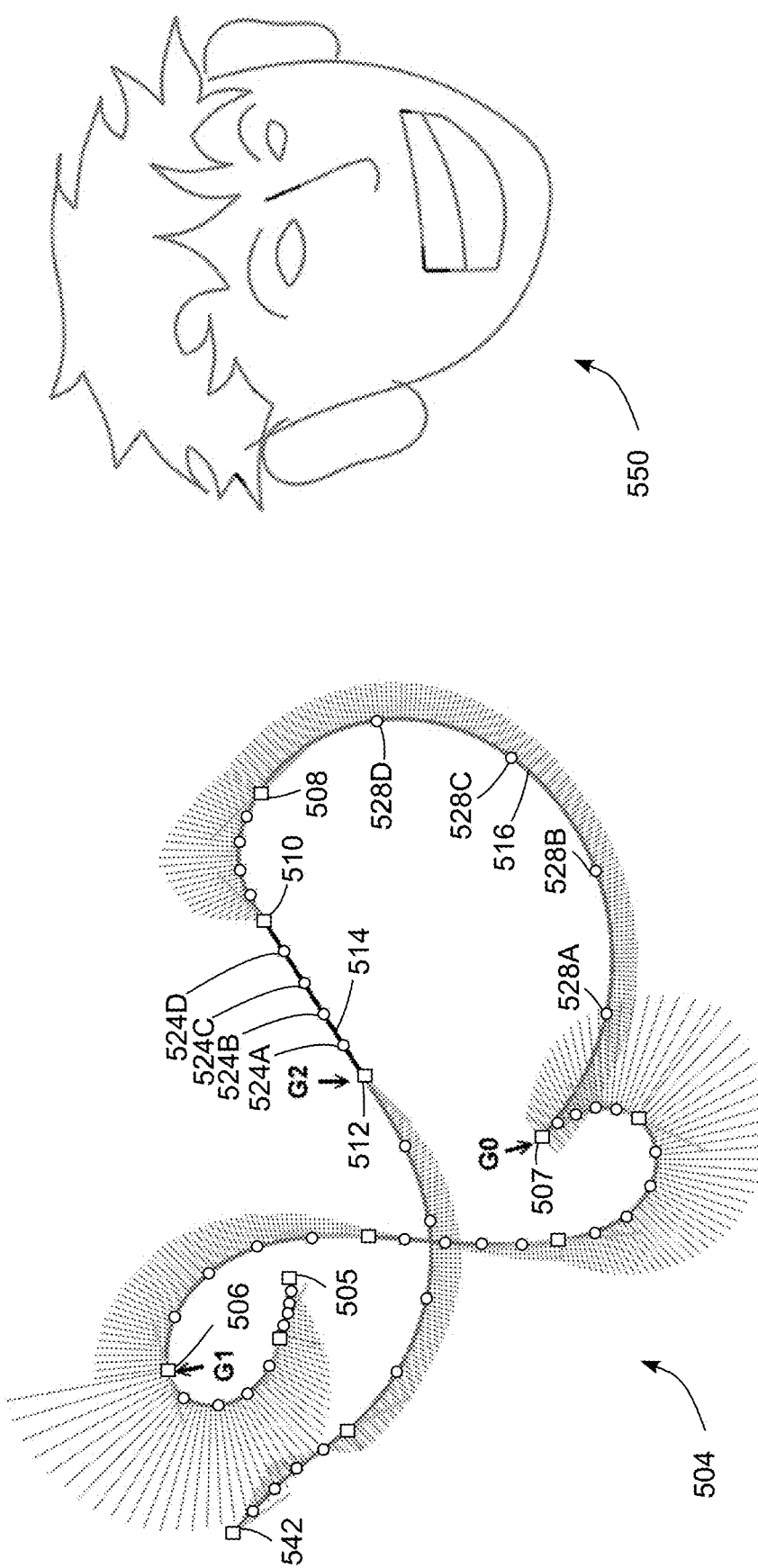
FIG. 4 is a depiction of two illustrations of curves formed from splines that the system 100 generates using the process 200 of FIG. 2 to meet different constraints for a set of control points.

In the example curve 504 of FIG. 4, the control point 506 is associated with a G1 tangent continuity constraint and the control point 512 is associated with a G2 curvature continuity constraint. All of the control points in the curve 504, including the labeled control point 507, are assigned a spatial continuity constraint "G0" that simply requires the spline for the generated curve to pass through each of the fixed control points.

Referring again to FIG. 2, the process 200 continues as the processor 128 executes the stored program instructions 144 to implement a multigrid solver that generates at least one additional parameter point at a third location in the two-dimensional plane and generates two or more spline segments to connect two control points together through at least one dynamically generated parameter point (block 208). In the system 100, the multigrid solver attempts to generate a multi-segment spline that satisfies all of the constraints by adjusting the parameter points to locations in multiple grids that correspond to locations in the two-dimensional plane that is occupied by the control points using discrete sets of spatial and curvature values that are also referred to as "grids" in the multigrid solver. Each grid in the multigrid solver has a "resolution" that refers to the number of potential solutions within a given solution space, such as the number of discrete two-dimensional coordinates for a parameter point inside of a predetermined region around a curve. The multigrid solver produces candidate solutions with varying levels of resolution from high-resolution spaces to lower resolution spaces that provide a lower number of potential solutions for "coarse" adjustments. The multigrid solver also adjusts the one-dimensional curvature parameters between the connected control points and parameter points to produce a spline that connects the control points together while passing through each of the parameter points. The multigrid solver adjusts the one-dimensional curvature parameters for each parameter point on a set of one-dimensional "grids" that specify the curvature between a pair of parameter points, such as setting the curvature as a single value for a straight line or arc or setting the curvature to have a linear slope for a clothoid. The multigrid solver uses both higher-resolution and lower-resolution solution spaces to reduce the effects of high-frequency and low-frequency errors in the results and to generate a spline that satisfies the constraints for all of the control points in a computationally efficient manner.

In the embodiment of FIG. 2, the system 100 uses the multigrid solver to adjust one or more sets of parameter points with a predetermined number of parameter points between each set of control points to generate a spline that joins all of the control points together while satisfying the constraints. The system 100 generates a first set of the control points to generate a curve that connects two control points and generates a second set, third set, etc. of additional parameter points between additional pairs of control points that define more complex curves. For a curve that includes three or more control points, such as the curve 504 of FIG. 4, the multigrid solver generates sets of parameter points to produce a spline that satisfies the constraints for all of the control points using an equal number of parameter points in each set between pairs of adjacent control points. For embodiments that include three or more control points, the multigrid solver operates in a "global" manner to generate a spline that satisfies all of the constraints for all of the control points instead of focusing on only individual pairs of control points in isolation. In the example of FIG. 4 the curve 504 includes four parameter points between each set of control points that form the curve, such as parameter points 524A-524D between the control points 510 and 512 and the parameter points 528A-528D between the control points 507 and 508.

While FIG. 4 depicts four parameter points between each set of control points, in other configurations the multigrid solver uses a different number of parameter points. More generally, in the process 200 the multigrid solver starts with a minimum predetermined number of parameter points in each set (e.g. two parameter points for each pair of control points in one practical embodiment of the system 100, although different embodiments may start with a different number of parameter points) that are combined with the control points to form the full spline. For each configuration of the parameter points, the multigrid solver identifies an error of the generated curve that connects two control points while passing through the parameter points using the one-dimensional curvature parameters. In the context of the process 200, the error refers to a deviation of one generated solution from the multigrid solver to the constraint requirements at each of the control points such as the tangent, curvature, and acceleration constraints described above. The multigrid solver generates different locations of the parameter points and one-dimensional curvature parameters using grids of different resolutions in an iterative manner until one of two events occurs: 1. The multigrid solver identifies a configuration of the parameter points that satisfies all of the constraints (e.g. the constraint is satisfied if the error values are either zero or less than a predetermined threshold level); or 2. The multigrid solver determines that the curve cannot be generated using the available number of parameter points while also satisfying the constraints (e.g. the error level does not drop to zero or below the predetermined error threshold level within a predetermined number of iterations).

If the multigrid solver fails to generate a spline that satisfies the constraints (block 212), then the processor 128 increases the number of parameter points in each set of parameter points between pairs of the control points (block 216) and returns to the processing described above with reference to block 208 to use generate another spline using the multigrid solver using a larger set of parameter points between each pair of control points.

In one embodiment, the processor 128 adds a single parameter point to the predetermined number of parameter points in each set starting from an initial number of parameter points (e.g. two parameter points) in one or more applications of the multigrid solver until there are a sufficient number of parameter points in each set to enable the multigrid solver to generate a spline that satisfies all of the constraints. For example, in a second iteration of the processing described above in block 208 the multigrid solver uses a set of three parameter points to generate a spline, followed by four or five parameter points if necessary. While the process 200 operates without a strict upper bound for the number of parameter points in each set that generates the spline, in most practical applications that generate curves in computer graphics the system 100 generates splines that satisfy the constraints using at most five parameter points in each set of parameter points. In each iteration of the multigrid solver, the processor 128 ignores any previous location and curvature parameters of the parameter points that were generated in candidate solutions in earlier iterations of the process 200. For example, when generating a solution with four parameter points the multigrid solver does not rely upon the position and curvature parameters of the parameter points from a previous iteration of the process that used only three parameter points. FIG. 2 depicts the process of increasing the number of parameter points to provide the multigrid solver with more flexibility in generating the spline as a separate process from the operation of the multigrid solver for explanatory purposes. However, those of skill in the art will recognize that at least some embodiments of the multigrid solver increase the number of parameter points, if necessary, during a single operation of the multigrid solver.

As described above, in the spline of FIG. 4, the curves between different control points have different types of curvature, such as the straight line segment 514 (k=0) and the curved segment 516 that has varying curvature values k between the parameter points 528A-528D. The multiple parameter points provide the multigrid solver with higher degrees of freedom to form different spline shapes to satisfy different constraints at different control points. More generally, during the process 200 the multigrid solver attempts to generate the spline that satisfies all of the constraints using a predetermined initial number of parameter points, with one practical embodiment of the process 200 starting with two parameter points in a first iteration of the multigrid solver. In some instances, the multigrid solver is unable to generate a spline that satisfies all of the constraints for the control points using the initial number of parameter points. During the process 200 the number of parameter points increase one or more times if necessary to enable the multigrid solver to generate a spline that satisfies all of the constraints using additional parameter points.

The addition of the parameter points enables the multigrid solver to produce a larger range of potential solutions to satisfy the constraints since the multigrid solver can now place additional parameter points on the two-dimensional space between each set of control points and assign more distinct curvature parameters to the increased number of parameter points to generate a spline that satisfies all of the constraints for the control points. The process of adding an additional parameter point to provide the multigrid solver with greater flexibility to generate different solutions is referred to as "relaxation". Those of skill in the art will recognize that one approach to generating a spline that satisfies all of the constraints simply uses a large number of parameter points to produce a solution. However, if the number of parameter points is set at a greater number than is necessary to satisfy all of the constraints, then multigrid solver may encounter a situation in which a very large number of valid curve solutions exist, especially curves that may have impractically large sizes and complex curvature shapes but that still technically satisfy all of the constraints. Consequently, during the process 200, the multigrid solver starts with a predetermined small number of parameter points between each pair of control points and attempts to find a valid spline solution that satisfies all of the constraints using a minimized number of parameter points.

Referring again to FIG. 2, if the multigrid solver successfully generates a spline including one or more sets of parameter points with locations and one-dimensional curve parameters satisfy all of the constraints (block 212) then the processor 128 performs at least one operation using the generated spline data to store the encoded spline representation data 156 in the memory 140 (block 220) or to generate a graphical display of the spline with the device 124 (block 224). In the embodiment of FIG. 1, the processor 128 combines the stored control point data 148 and the dynamically generated parameter point data 152 to form the stored encoded spline data 156. In some embodiments, the encoded spline data are suitable for use with vector graphics software that generates a graphical display of the spline using a graphical display device 124.

In the system 100, a vector graphics program uses the locations of the control points and parameter points of the spline in a two-dimensional plane and the one-dimensional curvature parameters of the spline to generate a graphical depiction of a curve that meets all of the constraints from the encoded spline data. For example, as described above in FIG. 1 the processor 128 generates the graphical display of the curve 160 based on a generated spline using the graphical display device 124. The encoded spline data 156 enable the system 100 to reproduce the graphical depiction of the curve at a later time or transmit the encoded spline data 156 to other computers in an efficiently encoded data format for display of the curves on other computing systems. Those of skill in the art will recognize that the graphics program can apply additional affine transformations to the spline to scale, reposition, and rotate the spline without affecting the curvature of the spline in the graphical display 124. In the process 200, the system 100 can perform the processing of blocks 220 and 224 in any order or concurrently.

The system 100 and process 200 enable the generation of a wide range of graphics that include parameterized curves that are based on the splines that are generated during the process 200 to form graphical depictions of curves that follow various constraints. For example, in FIG. 4 the illustration 504 shows a complex curve with different points that satisfy different constraints specified by the user described above. The point 506 has simple spatial continuity between two different clothoids that both end at the point 506. The point 506 satisfies a tangential continuity constraint between two different clothoids that have different levels of curvature as depicted by the perpendicular lines extending from the curve in the illustration 504. The point 512 satisfies a curvature continuity constraint as a clothoid with a linearly varying curvature reaches zero curvature at the point 512, which is also the end of a straight line with zero curvature. As described above, in some embodiments a portion of the illustration 504 is formed manually by the user via the input devices 120, such as the straight line segment 514 in FIG. 4, while the system 100 automatically generates other portions of the curves from start and end points that are specified in the manual illustration. The system 100 produces the curves in the illustration 504 based on the user input and the automatic generation of one or more splines as described above in the process 200. In the illustration 550, the system 100 generates splines for various curves that are integrated with hand-drawn illustrations to form an illustration of a human face.

One advantage to the operation of the process 200 using the multigrid solver with relaxation process that increases the number of parameter points only as necessary is that the multigrid solver generates the splines with a high degree of stability. In the context of the process 200, the stability property enables the multigrid solver produces curves with similar general shapes when provided with input control points and constraints that are similar to, but not identical, to each other. For example, in many interactive graphics applications a user provides control points to generate an initial curve and then make minor adjustments to the positions of control points in an interactive manner. The system 100 regenerate the curves using the multigrid solver in the process 200 to produce splines with similar general shapes as the user makes minor adjustments to the locations of the control points.

The embodiments described herein provide specific improvements to the function of computerized systems that generate graphics in an automated manner and, more particularly, to the automated generation of splines and graphics of curves based on the splines that satisfy the tangent, curvature, and acceleration continuity constraints described above. In particular, the system 100 and the process 200 improve the efficiency of the generation of graphics for parameterized curves with a new curve type, which is parameterized by a piecewise-linear curvature function.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for automated generation and display of curves for computer graphics comprising:
   receiving, with an input device, a first control point corresponding to a first location in a two-dimensional plane and a second control point corresponding to a second location in the two-dimensional plane, the first location and the second location being two points on a curve in the two-dimensional plane;
   receiving, with the input device, at least one constraint for at least one of the first control point and the second control point;
   generating, with a processor, a first set of parameter points to generate a first spline connecting the first control point to the second control point based on the at least one constraint using a multigrid solver, the first set of parameter points including a first predetermined number of parameter points, and each parameter point in the first set of parameter points corresponding to a location in the two-dimensional plane and having a curvature parameter determined from a one-dimensional polynomial function;
   identifying, with the processor, that the first spline including the first set of parameter points fails to satisfy the at least one constraint using the multigrid solver;
   generating, with the processor, a second set of parameter points to generate a second spline connecting the first control point to the second control point based on the at least one constraint using the multigrid solver, the second set of parameter points including at least one more parameter point than the first predetermined number of parameter points, and each parameter point in the second set of parameter points corresponding to a location in the two-dimensional plane and having a curvature parameter determined from a one-dimensional polynomial function; and
   generating, with the processor and a graphical display device, a graphical rendering of the second spline connecting the first control point to the second control point in the two-dimensional plane in response to the second spline satisfying the at least one constraint, the second spline corresponding to the curve.

2. The method of claim 1 further comprising:
   storing, with the processor, an encoded representation of the second spline including the first location of the first control point, the second location of the second control point, and the location and the curvature parameter of each parameter point in the second set of parameter points in a memory in response to the second spline satisfying the at least one constraint.

3. The method of claim 1, wherein:
   the processor generates two parameter points in the first set of parameter points and generates three parameter points in the second set of parameter points; and
   the processor generates no more than five parameter points in a given set of parameter points.

4. The method of claim 1 further comprising:
   receiving, with the input device, a third control point corresponding to a third location in the two-dimensional plane;

receiving, with the input device, the at least one constraint for at least one of the first control point, the second control point, and the third control point; and generating, with the processor, the second spline using the second set of parameter points to connect the first control point to the second control point and a third set of parameter points to connect the second control point to the third control point, the third set of parameter points including the first predetermined number of parameter points, based on the at least one constraint using the multigrid solver, each parameter point in the second set of parameter points and the third set of parameter points corresponding to a location in the two-dimensional plane and having a curvature parameter determined from a one-dimensional polynomial function.

5. The method of claim 1, the receiving of the at least one constraint for the curve at the first control point and the second control point further comprising:

receiving, with the input device, a tangent continuity constraint.

6. The method of claim 1, the receiving of the at least one constraint for the curve at the first control point and the second control further comprising:

receiving, with the input device, a curvature continuity constraint.

7. The method of claim 1, the receiving of the curve at the first control point and the second control further comprising:

receiving, with the input device, an acceleration continuity constraint.

8. The method of claim 1, the receiving of the first control point for the curve further comprising:

receiving, with the input device, a user input corresponding to a line; and identifying, with the processor, the first control point as one end of the line.

9. A system for generating graphics comprising:

an input device;

a graphical display device;

a memory; and a processor operatively connected to the input device, the graphical display device, and the memory, the processor configured to:

receive a first control point corresponding to a first location in a two-dimensional plane and a second control point corresponding to a second location in the two-dimensional plane with the input device, the first location and the second location being two points on a curve in the two-dimensional plane;

receive at least one constraint for at least one of the first control point and the second control point with the input device;

generate a first set of parameter points to generate a first spline connecting the first control point to the second control point based on the at least one constraint using a multigrid solver, the first set of parameter points including a first predetermined number of parameter points, and each parameter point in the first set of parameter points corresponding to a location in the two-dimensional plane and having a curvature parameter determined from a one-dimensional polynomial function;

identify that the first spline including the first set of parameter points fails to satisfy the at least one constraint using the multigrid solver;

generate a second set of parameter points to generate a second spline connecting the first control point to the second control point based on the at least one constraint using the multigrid solver, the second set of parameter points including at least one more parameter point than the first predetermined number of parameter points, and each parameter point in the second set of parameter points corresponding to a location in the two-dimensional plane and a curvature parameter determined from a one-dimensional polynomial function; and generate a graphical rendering of the second spline connecting the first control point to the second control point in the two-dimensional plane in response to the second spline satisfying the at least one constraint with the graphical display device, the second spline corresponding to the curve.

10. The system of claim 9, the processor being further configured to:

store an encoded representation of the second spline including the first location of the first control point, the second location of the second control point, and the location and the curvature parameter of each parameter point in the second set of parameter points in the memory in response to the second spline satisfying the at least one constraint.

11. The system of claim 9, wherein: the processor generates two parameter points in the first set of parameter points and generates three parameter points in the second set of parameter points; and the processor generates no more than five parameter points in a given set of parameter points.

12. The system of claim 9, the processor being further configured to:

receive a third control point corresponding to a third location in the two-dimensional plane with the input device;

receive the at least one constraint for at least one of the first control point, the second control point, and the third control point with the input device; and generate the second spline using the second set of parameter points to connect the first control point to the second control point and a third set of parameter points to connect the second control point to the third control point, the third set of parameter points including the first predetermined number of parameter points, based on the at least one constraint using the multigrid solver, each parameter point in the second set of parameter points and the third set of parameter points corresponding to a location in the two-dimensional plane and a curvature parameter determined from a one-dimensional polynomial function.

13. The system of claim 9, the processor being further configured to:

receive a tangent continuity constraint with the input device.

14. The system of claim 9, the processor being further configured to:

receive a curvature continuity constraint with the input device.

15. The system of claim 9, the processor being further configured to:

receive an acceleration continuity constraint with the input device.

16. The system of claim 9, the processor being further configured to:

receive a user input corresponding to a line with the input device; and identify the first control point as one end of the line with the input device.

\* \* \* \* \*